(12) United States Patent
Balon, Jr. et al.

(10) Patent No.: US 12,110,466 B2
(45) Date of Patent: Oct. 8, 2024

(54) METHOD AND APPARATUS FOR A TORREFACTION PROCESS

(71) Applicant: CEG TECHNOLOGY UK LIMITED, Enderby (GB)

(72) Inventors: Thomas Hamilton Balon, Jr., Pembroke, NH (US); Neil Alan Butler, Derbyshire (GB); Peter Fransciscus Johannes Maria Scheepers, Soerendonk (NL)

(73) Assignee: Perpetual Next Technologies B.V., Amsterdam (NL)

( * ) Notice: Subject to any disclaimer, the term of this patent is extended or adjusted under 35 U.S.C. 154(b) by 41 days.

(21) Appl. No.: 17/631,518

(22) PCT Filed: Jul. 24, 2020

(86) PCT No.: PCT/EP2020/071033
§ 371 (c)(1),
(2) Date: Jan. 31, 2022

(87) PCT Pub. No.: WO2021/018794
PCT Pub. Date: Feb. 4, 2021

(65) Prior Publication Data
US 2022/0267692 A1 Aug. 25, 2022

(30) Foreign Application Priority Data
Jul. 31, 2019 (EP) .................... 19189327

(51) Int. Cl.
*C10L 9/08* (2006.01)

(52) U.S. Cl.
CPC .......... *C10L 9/083* (2013.01); *C10L 2290/06* (2013.01); *C10L 2290/10* (2013.01); *C10L 2290/145* (2013.01)

(58) Field of Classification Search
CPC .. C10L 9/083; C10L 2290/06; C10L 2290/10; C10L 2290/145; Y02E 50/10; Y02E 50/30
See application file for complete search history.

(56) References Cited

U.S. PATENT DOCUMENTS

| | | | |
|---|---|---|---|
| 2012/0017499 A1 | 1/2012 | Leonhardt | |
| 2012/0192485 A1* | 8/2012 | Grassi | C10L 5/445 44/605 |
| 2012/0261246 A1* | 10/2012 | Ben-Tovim | C10L 9/083 202/99 |
| 2014/0053458 A1* | 2/2014 | Bar-Ziv | C10B 57/02 44/589 |

(Continued)

FOREIGN PATENT DOCUMENTS

| | | |
|---|---|---|
| WO | 2012158118 A1 | 11/2012 |
| WO | 2013173929 A1 | 11/2013 |
| WO | 2015084162 A1 | 6/2015 |

*Primary Examiner* — Ellen M McAvoy
(74) *Attorney, Agent, or Firm* — David P. Owen; Hoyng Rokh Monegier B.V.

(57) ABSTRACT

A torrefaction method comprises forwarding biomass through a process chamber; heating the biomass in the process chamber to a predetermined temperature and pyrolyzing the biomass to release syngas from the biomass, wherein the syngas contains at least 20% of the power contained in the flow of the biomass; and oxidizing the syngas to heat the biomass in the process chamber.

20 Claims, 2 Drawing Sheets

(56) References Cited

U.S. PATENT DOCUMENTS

| | | | |
|---|---|---|---|
| 2015/0143742 A1* | 5/2015 | Prud'Homme | C10L 9/083 |
| | | | 44/605 |
| 2015/0152347 A1* | 6/2015 | Balon, Jr. | C10L 9/083 |
| | | | 44/605 |
| 2015/0376530 A1* | 12/2015 | Brusletto | C10L 9/06 |
| | | | 44/590 |
| 2016/0304800 A1* | 10/2016 | Rautialinen | C10L 5/445 |
| 2017/0145332 A1* | 5/2017 | Balon, Jr. | C10L 5/447 |
| 2017/0183588 A1* | 6/2017 | Vieslet | C10L 9/08 |
| 2018/0023013 A1* | 1/2018 | Prud'Homme | C10L 5/442 |
| | | | 44/605 |
| 2020/0056098 A1* | 2/2020 | Seidner | C10L 9/083 |
| 2022/0204860 A1* | 6/2022 | Foidl | C10B 53/02 |

* cited by examiner

METHOD AND APPARATUS FOR A TORREFACTION PROCESS

FIELD OF THE INVENTION

The invention generally refers to a method and an apparatus for a torrefaction process.

BACKGROUND OF THE INVENTION

In countries without natural resources of fossil fuels such as coal and oil, and in countries wishing to shift to sustainable energy generation, biomass is considered as an alternative source. In that regard, use of gas generated by a breakdown of organic matter in the absence of oxygen, usually referred to as biogas, has been practiced for quite some time. Biogas however generally requires gas tanks for storage which greatly limits storage capacity. Further, some of the components are toxic or considered a greenhouse gas. The production of biogas further produces a digestate of material remaining after the production of biogas. Such digestate sometimes is difficult to dispose.

Torrefaction has been found to transform biomass into biocoal or biochar, a solid with low moisture content and an amount, particularly mass percentage, of carbon increased as compared to the initial biomass. Biomass usually means wood chips, but a large variety of biomass is conceivable. Biocoal produced by torrefaction has been found to have less weight, particularly less oxygen weight, and a higher energy density as regards volume and mass than the initial biomass. Biocoal from torrefaction can be used much like traditional fossil coal for energy generation in conventional coal powered plants. Other applications such as steel production are conceivable if the biocoal has a sufficient high grading. The biocoal additionally is chemically stable and thus can be easily stored and transported much like traditional coal.

In principal, torrefaction is a pyrolysis process under essentially atmospheric pressure, essentially in absence of oxygen other than the oxygen contained in the biomass itself. Typically, biomass is exposed to temperatures anywhere between 200° C. and 350° C. for a residence time anywhere between 10 minutes and 120 minutes. The quality of the resulting biocoal is determined by that temperature and residence time. During torrefaction, syngas is separated from the biomass. The syngas contains tar, $H_2$, $CH_4$ and/or CO. While usually in the gas phase, the syngas may also contain droplets of condensed tar. Principally, the syngas is cooled to condense and remove the tar from the syngas such that the syngas can be used in conventional applications such as gas engines for the generation of electric energy.

The conventional torrefaction process usually provides biocoal with an energy density of 20 to 21 GJ/ton. As will be discussed in further detail below, the energy density principally is dependent on the temperature and the residence time of the biomass in the process atmosphere, wherein longer residence time or higher temperatures provide biocoal with a higher energy density though with a lower amount of energy from the original biomass.

However, as the energy density increases, the amount of tar generated and contained in the syngas increases as well. This requires increased amounts of tar to be removed from the syngas. Tar in the syngas could otherwise condense spontaneously and foul or coke up the gas engine. Also, when tar is put to use, polycyclic aromatic hydrocarbons are potentially released which are found to be linked to various forms of cancer. For that reason, tar is usually replaced by bitumen, which in turn makes it more difficult to make use of the tar produced during torrefaction.

WO 2015/084162 A1 describes that a modified dryer operates on a different principle from that used by the prior torrefaction plants. The subject invention utilizes thermal conduction to torrefy the biomass in a vibratory reactor in which a heated solid unperforated plate is sealed in the reactor to separate the biomass above from the gas used to heat the plate below. Also, syngas evolved from the process is utilized to power a gas engine, the exhaust output of which is recirculated to heat the reactor plate. When the gas engine is coupled to an electric generator, waste energy is recovered for use in other parts of the plant or exported elsewhere.

SUMMARY

While the invention is defined in the independent claims, further aspects of the invention are set forth in the dependent claims, the drawings and the following description.

DESCRIPTION OF THE PREFERRED EMBODIMENTS

Figure 1:
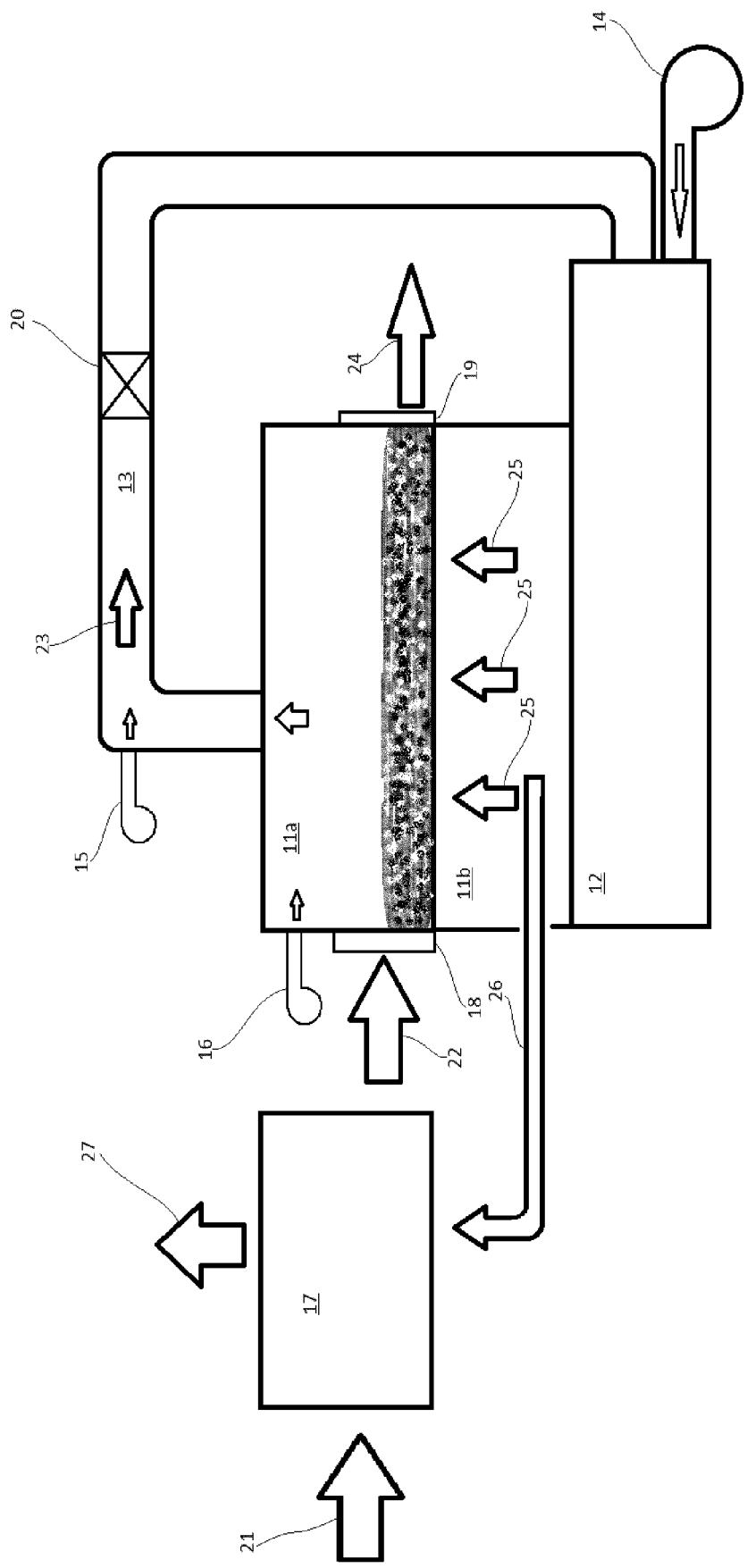
FIG. 1 shows a torrefaction apparatus according to an embodiment of the invention.

FIG. 1 shows a torrefaction apparatus comprising a process chamber 11a and an oxidizer 12. Before explaining the torrefaction apparatus in detail, some general aspects of the invention will be discussed.

According to an aspect a torrefaction apparatus comprises:
 a process chamber arranged to accommodate a torrefaction process of biomass;
 an oxidizer arranged to heat the process chamber; and
 a conduit for syngas emitted from the biomass during the torrefaction process;
wherein the conduit is arranged to guide the syngas from the process chamber to the oxidizer; wherein the oxidizer is configured to provide an oxidation of the syngas releasing a power of at least 20% of the power contained in a maximum flow of biomass through the process chamber.

The resulting biocoal is hydrophobic and can thus be stored easily without further weather protection. It can be made waterproof with specific additives. The biocoal may be dust fired in existing equipment.

In the following, a flow of biomass refers to the amount of biomass in a specific time span. For example, the flow of biomass can be indicated as mass of biomass in kilogram [kg] per time in hours [hrs] or $$\frac{\text{biomass [kg]}}{\text{time [hrs]}}.$$

A maximum flow of biomass through the process chamber indicates the amount of biomass the process chamber is dimensioned to process maximally in a specific time span. As the flow of biomass is a quantity per time, the energy contained in that quantity in that time corresponds to a power.

In some embodiments the conduit is configured to maintain a syngas temperature during operation above a condensation temperature of the syngas from the process chamber. In various embodiments the syngas temperature is maintained above 330° C. and/or at a temperature at least 50° C. above a maximum temperature of the biomass in the process chamber. In various embodiments, the maximum temperature of the biomass is a core temperature of individual particles. Usually, the core temperature adapts in a delayed fashion to the ambient temperature and might be different from a surface temperature of a particle. Having the syngas combusted in the oxidizer immediately adjacent to the process chamber also limits the effort needed to maintain the syngas temperature above a condensation temperature of the syngas.

For example, while passing the process chamber, the biomass is heated to a temperature of up to 280° C. The conduit thus maintains the temperature of the syngas at 330° C. In a different example, the biomass is heated to a temperature of up to 300° C. The conduit thus maintains the temperature of the syngas at 350° C. The biomass reaches the maximum temperature just before exiting the process chamber.

In some embodiments the conduit is heat insulated.

In some embodiments the conduit and/or the process chamber comprise an air inlet allowing for a controlled combustion of a share of the syngas. This usually means that some of the syngas is burned prior to reaching the oxidizer. For example, in an apparatus having an oxidizer burning about 4 MW, the syngas burned in the conduit and/or the process chamber corresponds to about 100 kW.

In some embodiments the oxidizer is configured to provide an oxidation releasing a power of at least 23%, 25% or 27% of the power contained in a maximum flow of biomass through the process chamber. In some embodiments the oxidizer is configured to provide an oxidation releasing a power of no more than 36% or 40% of the power contained in a maximum flow of biomass through the process chamber. In some embodiments the oxidizer is configured to provide an oxidation releasing a power of between 23% and 40%. In some embodiments the oxidizer is configured to provide an oxidation releasing a power of between 23% and 36%. In some embodiments the oxidizer is configured to provide an oxidation releasing a power of between 25% and 40%. In some embodiments the oxidizer is configured to provide an oxidation releasing a power of between 25% and 36%. In some embodiments the oxidizer is configured to provide an oxidation releasing a power of between 27% and 40%. In some embodiments the oxidizer is configured to provide an oxidation releasing a power of between 27% and 36%.

The more power the oxidizer processes, the higher the energy density of the resulting biocoal. A higher energy density might make the biocoal applicable for additional applications such as steel production.

In some embodiments the oxidizer is arranged to burn the syngas at a temperature above 750° C., more preferably above 850° C. or 1050° C. In various embodiments the oxidizer is configured for syngas to pass within a residence time of 1 second, preferably within 2 seconds. It has been found that for an oxidizer configured for a residence time of 1 second, a temperature of at least 850° C. allows for essentially complete combustion of the combustible components of the syngas. In various embodiments, temperature of the oxidizer and residence time of the syngas are adjusted to allow for an essentially complete combustion.

In some embodiments the oxidizer is configured to maintain the process chamber at a temperature between 400° C. and 650° C., preferably at around 500° C. In further embodiments the torrefaction apparatus is provided with a cooling structure dissipating some of a thermal energy from the oxidation to different sinks to control a temperature of the process chamber. In various embodiments this allows for plant construction of specific grades of lower cost materials.

In some embodiments the oxidizer is arranged with an oxidizer air feed, the oxidizer air feed being configured to maintain the temperature of the process chamber below 600° C., preferably below 550° C., by generating a flow of ambient dilution air in the direction of the process chamber. In some embodiments the warm gas is additionally or alternatively passed from the process chamber to a dryer where biomass is dried prior to entering the process chamber. The oxidizer air feed in some embodiments is a blower or a fan.

In some embodiments the process chamber has a temperature rating below 600° C., preferably at 550° C. and below. The temperature rating refers to a temperature at which the process chamber can be operated without damage to the reactor. Process chambers with a higher temperature rating require different material and different construction which usually makes the process chamber much more expensive.

In some embodiments the process chamber has a temperature above 500° C., as high as 950° C., using higher grade materials and insulation to protect lower grade materials to either aid in the increased biomass processing capacity of the production of very high grade carbon materials such as coke.

In some embodiments the process chamber comprises a feeding element, a conveying element and/or a dispensing element configured to keep a specific volume of biomass in the process chamber for a time between 15 and 30 minutes. In some examples this leads to an output biocoal with an energy content between 22 GJ/ton and 30 GJ/ton for a biomass input at 3100 kg/hr corresponding to about 14.6 MW of power, as temperature and residence time substantially determines the energy content of the output.

In some embodiments the process chamber is configured to minimize spontaneous air exchange between its content and ambient air, wherein the process chamber preferably comprises an inlet having an airlock and an outlet having an airlock to convey biomass through the inlet, the process chamber and the outlet, wherein the process chamber preferably is maintained at a pressure below ambient air pressure. Due to maintaining the process chamber at below ambient air pressure, minor leaks of the process chamber will not release syngas into the environment which would otherwise be both, a health problem and a safety hazard. In some embodiments the conduit comprises a fan or blower to create the low pressure inside the process chamber.

In some embodiments the syngas contains tar, $H_2$, $CH_4$ and/or CO, wherein the oxidizer is preferably configured such as to burn at least part of the tar.

According to a further aspect a torrefaction method comprises:

forwarding biomass through a process chamber;
heating the biomass in the process chamber to a predetermined temperature and pyrolyzing the biomass to release syngas from the biomass, wherein the syngas contains at least 20% of the power contained in the flow of the biomass; and
oxidizing the syngas to heat the biomass in the process chamber.

In some embodiments a specific volume of biomass is kept in the process chamber for between 15 and 30 minutes.

In some embodiments the syngas is maintained at a temperature above a condensation temperature of the components of the syngas. In various embodiments the syngas temperature is maintained above 330° C. and/or at a temperature at least 50° C. above a maximum temperature of the biomass in the process chamber. Maintaining the syngas at that temperature avoids tars condensing before reaching the oxidizer where they are burned.

In some embodiments the syngas is mixed with a controlled flow of air, the air preferably being heated. Mixing the syngas with some air allows for a controlled combustion which maintains the temperature of the syngas.

In some embodiment the oxidizer burns the syngas at a temperature above 750° C., more preferably above 850° C. or 1050° C., to provide the thermal energy to heat the biomass in the process chamber. In some embodiments the syngas passes the oxidizer within at least 1 second, preferably within 2 seconds. Burning at these temperatures allows oxidation of substantial amounts of the tars.

In some embodiments a flow of air adjusts the thermal energy delivered to the process chamber. In some embodiments thermal energy is further passed to a dryer where biomass is dried prior to entering the process chamber. In some embodiments the oxidizer air feed creates pressure forcing the warm gas containing the thermal energy from the oxidation past the process chamber and towards the dryer. This may avoid an additional fan between the oxidizer and the dryer, which otherwise would need to be configured for very high temperatures.

It has been found that the amount of tars created during torrefaction can be reduced by combustion in the process chamber, the conduit and/or the oxidizer. The combusted tar may be used to heat the biomass in the process chamber and/or in the oxidizer.

Coming back to the description of FIG. 1, biomass 21 in various embodiments is stored and fed into a dryer 17 where it is heated to remove water, preferably by evaporation. The dried biomass 22 is then supplied into the process chamber 11a. In operation, the oxidizer 12 provides thermal energy 25 to the process chamber 11a. The process chamber 11a produces syngas 23 such as tars, hydrogen, methane and carbon monoxide on the one hand and solid components 24 on the other hand by processing dried biomass 22 in a torrefaction process. In the following, the solid components will be referred to as biochar or biocoal. In various embodiments the oxidizer is configured to burn the syngas 23 to provide the thermal energy 25.

The flow of syngas 23 in a given time frame contains energy of at least 20% of the flow of biomass in the same time frame. The oxidizer 12 thus is configured to burn corresponding amounts in that time interval. As is understood in the art this means that an air feed or an oxygen feed to the oxidizer is dimensioned accordingly. At least part of the 20% of the energy content of the biomass processed during a time interval is essentially used to heat the process chamber 11a during roughly that time interval.

The torrefaction apparatus further comprises a conduit 13 to feed the syngas 23 to the oxidizer 12. In various embodiments the process chamber 11a and the conduit 13 are configured to maintain a temperature of the syngas 23 above the condensation temperature of most components of the syngas. Particularly components with a high condensation temperature such as tar thus remain in the gas phase and are fed to the oxidizer 12. Accordingly, the amount of tar released from the torrefaction apparatus is reduced.

As will be explained further below, this allows producing biocoal 24 with a higher energy density, particularly in energy content per unit mass. Particularly, the energy density of the biocoal as produced by the inventive concept is at least 22 GJ/ton, preferably at 24 GJ/ton, but also at grades up to and higher than 28 GJ/ton.

To maintain the temperature of the syngas 23, in various embodiments the conduit 13 is arranged with heat insulation to maintain the temperature of the syngas 23. In further embodiments the conduit 13 is arranged with a first air feed 15 configured to supply heated compressed air into the conduit 13. In various embodiments the process chamber 11a is arranged with a second air feed 16 configured to supply heated compressed air into the process chamber 11a. In various embodiments the air of the first and second air feeds 15, 16 is heated by the oxidizer 12.

The heated air supplied into the process chamber 11a and/or into the conduit 13 heats the syngas 23 and allows for a controlled combustion of some of the tar to maintain the temperature of the syngas 23. Combustion of some of the tar reduces the amount of tar among the syngas 23.

In various embodiments the first and second air feeds 15, 16 supply air with ambient temperature. In further embodiments the first and second air feeds 15, 16 supply air heated by the oxidizer 12. In further embodiments the first and second air feeds 15, 16 are connected to the same source of compressed air. In various embodiments the first and second air feeds are controlled in a closed loop to maintain a temperature of the syngas 23 above the condensation temperature of most components of the syngas 23.

In various embodiments the oxidizer 12 is accommodated in a heating chamber 11b arranged abutting the process chamber 11a. In various embodiments the heating chamber 11b is arranged below the process chamber 11b. The heating chamber 11b is arranged to keep the thermal energy 25 adjacent to the process chamber 11b. The oxidizer 12 is further arranged with an oxidizer air feed 14. In various embodiments the oxidizer air feed 14 is arranged to supply oxygen for oxidizing the syngas 23. In various embodiments the oxidizer air feed 14 is configured to supply more air than needed to oxidize the syngas 23. In various embodiments the oxidizer air feed 14 is configured to supply air to adjust the thermal energy 25 supplied to the process chamber 11a and thus control the temperature of the process chamber 11a. In various embodiments the oxidizer air feed 14 supplies ambient air. In different embodiments the oxidizer 12 is supplied with a feed providing oxygen from a source other than air.

In various embodiments the oxidizer 12 is arranged to burn the syngas 23 at a temperature above 750° C., preferably above 850° C., more preferably above 950° C. or 1050° C. In various embodiments the oxidizer is configured to allow the syngas to pass within a residence time of at least 1 second, preferably within 2 or more seconds. The residence time and oxidizer temperature are preferably configured to allow for an essentially complete combustion of the combustible components of the syngas 23. In various embodiments the oxidizer air feed 14 is arranged to control the thermal energy 25 generated by the oxidizer 12 such that the process chamber 11a is heated to a temperature of no less than 400° C., preferably at 500° C.

In various embodiments the heating chamber 11b is maintained at a temperature of no more than 600° C., preferably at 550° C. Limiting the temperature of the process chamber 11a and/or the heating chamber 11b allows using less expensive materials to build the process chamber 11a and/or the heating chamber 11b, or the whole torrefaction apparatus, thus allowing for a more economically viable design. In various embodiments air from the oxidizer air feed 14 is used to adjust the thermal energy 25 between the oxidizer 12 and the process chamber 11a to adjust the temperature of the process chamber 11a and/or the heating chamber 11b. In various embodiments the oxidizer air feed 14 comprises two separate fans to supply air for oxidizing the syngas 23 and to adjust the temperature of the process chamber 11a and/or the heating chamber 11b.

In various embodiments the air supplied by the oxidizer air feed 14 and the oxidized syngas form a flow of warm gas 26 used as a source of heat. In various embodiments the flow of warm gas 26 passes from the heating chamber 11b to the dryer 17. In the dryer 17, the flow of warm gas 26 dries the biomass 21 by evaporating water 27. The flow of warm gas 26 and the evaporated water 27 are then released from the dryer 17.

In further embodiments the dryer 17 is arranged adjacent to the process chamber 11a. In various embodiments the oxidizer air feed 14 is configured to supply air under sufficient pressure to the oxidizer 12 such that the flow of warm gas 26 passes from the heating chamber 11b to the dryer 17. In various embodiments the flow of warm gas 26 is mixed with the biomass 21. In various embodiments the oxidizer 12 and the dryer are arranged such that the flow of warm gas 26 heats the dryer 17 without contacting the biomass 21. In various embodiments a pipeline for the warm gas 26 is arranged between the chamber containing the oxidizer 12 and the dryer 17. Preferably, the dryer is a cross flow dryer in which the stream of warm gas 26 passes the biomass perpendicularly to the flow of biomass 21. In further embodiments the stream of warm gas 26 and the flow of biomass 21 pass the dryer 17 concurrently in the same direction or countercurrent in opposite directions.

In various embodiments the oxidizer sized to process syngas containing at least 20% of the power of the flow of biomass is essentially arranged with an oxidizer air feed 14 supplying sufficient amounts of oxygen to burn essentially all of the corresponding flow of combustible syngas containing the at least 20% of the power of the flow of biomass. In various embodiments the oxidizer air feed 14 supplies more oxygen than could be burned with the syngas.

In various embodiments the process chamber 11a is maintained at a pressure different from an ambient pressure. In some embodiments the pressure inside the process chamber 11a is below the ambient pressure. This prevents that syngas 23 generated inside the process chamber 11a escape into the environment. The syngas 23 could otherwise present a health risk for an operator as well as ignite as soon as they escape from the process chamber 11a and contact the ambient air.

In various embodiments the process chamber 11a comprises an inlet airlock 18 allowing dried biomass 22 to enter the process chamber 11a while preventing air exchange between the inside of the process chamber 11a and an ambient atmosphere. In various embodiments the process chamber 11a comprises an outlet airlock 19 allowing biocoal 23 to exit the process chamber 11a while preventing air exchange between the inside of the process chamber 11a and an ambient atmosphere.

The conduit 13 comprises a fan 20 to move the syngas 23 from the process chamber 11a to the oxidizer 12. In some embodiments a pressure in the process chamber 11a forwards the syngas 23 to the oxidizer 12 and no fan is needed. In further embodiments the fan 20 creates a pressure inside the process chamber 11a which pressure is below ambient pressure. Accordingly, if the process chamber 11a has a leak, little syngas will exit the process chamber 11a through the leak into the environment.

Figure 2:
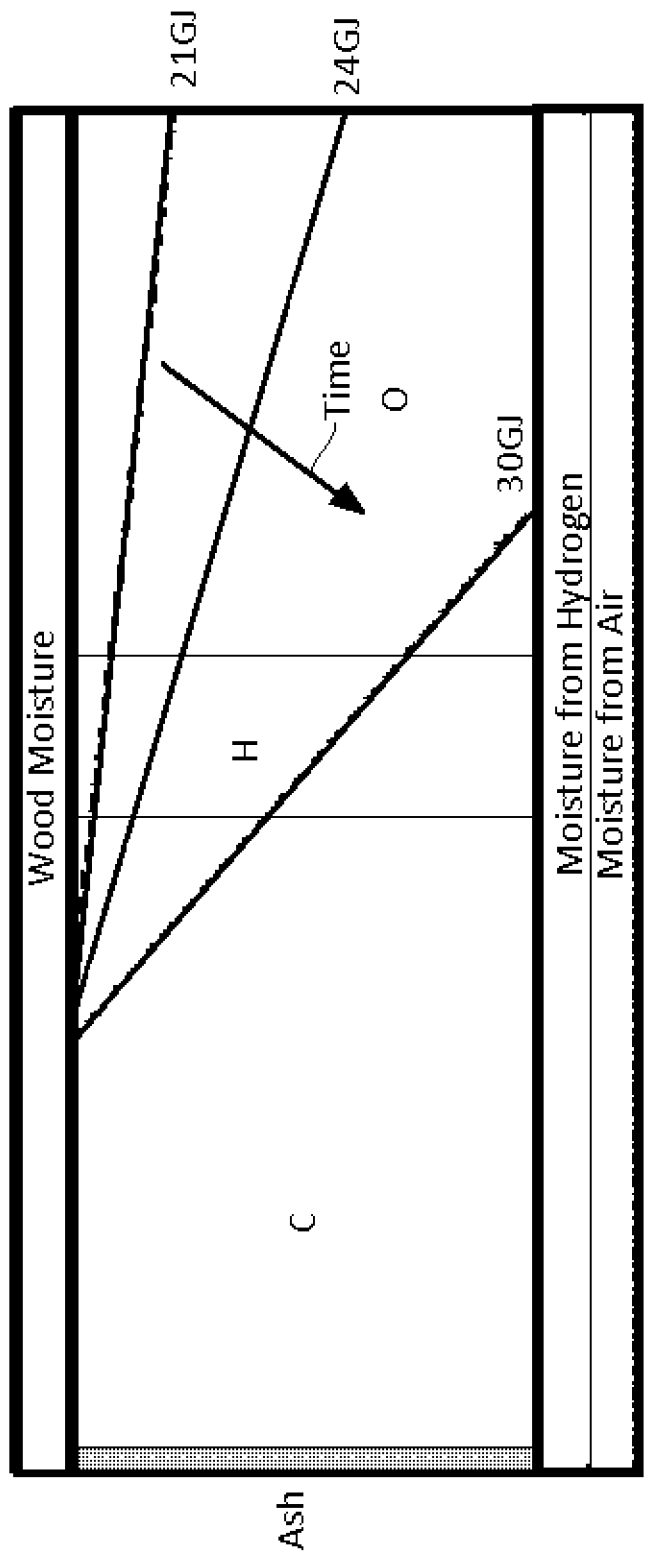
FIG. 2 is a schematic drawing showing an embodiment of the reagents and the products of the torrefaction process for different amounts of energy content.

FIG. 2 is a schematic drawing showing an embodiment of the reagents in the process chamber 11a as well as the products for different amounts of energy content. In an embodiment essentially comprising biomass from wood the reagents fed into the process chamber 11a primarily comprise carbon C, Oxygen O and hydrogen $H_2$. In various embodiments the reagents from wood further contain Ash, moisture contained in the wood, if wood is supplied, moisture from hydrogen and moisture from air. In an embodiment about 49% of the wood in mass is carbon C, about roughly 44% is oxygen O, about 6% is hydrogen H and the rest (about 1%) is made up of ashes, nitrogen and other elements. The other reagents are moisture from different sources, such as wood moisture, moisture from hydrogen and moisture from air entering the process chamber 11a together with the dried biomass and/or with the compressed air.

The three slant solid lines in FIG. 2 indicate the qualitative distribution of the biomass content into biocoal and syngas for different energy densities per ton in the biocoal 24, that is after torrefaction. Particularly, the part of the diagram on the left of the respective slant solid line becomes biocoal 24 and the part of the diagram on the right of the respective slant solid line becomes syngas 23.

The slant line for biocoal with an energy density of 21 GJ/ton thus provides a distribution of content in the biocoal not so different from the dried biomass. Most importantly, the resulting syngas contains very little carbon C. Accordingly, little tars need to be removed from the syngas.

The slant line for biocoal with an energy density of 24 GJ/ton provides a distribution in which the biocoal contains roughly somewhere between a quarter and half less non-carbon elements such as oxygen O and hydrogen H. As substantial energy is contained in the carbon, the energy density increases when oxygen O is removed. However, the syngas for the 24 GJ/ton energy density biocoal likewise contains more carbon C and thus tars than the previously discussed biocoal.

The slant line for biocoal with an energy density of 30 GJ/ton provides a distribution in which the biocoal contains a comparably small amount of oxygen O and hydrogen H to allow for such high energy density. However, FIG. 2 also shows that the syngas for the 30 GJ/ton energy density contains substantial amounts of carbon and thus, tar.

In the process according to the invention the tar remains with the syngas and is burned in order to operate the process chamber 11a and dry biomass. The tar thus does not require treatment separate from the torrefaction apparatus but instead delivers energy to run the torrefaction apparatus. The energy of the tar usually comes from the carbon and hydrogen content of the syngas.

The energy density of the biocoal is particularly determined by the residence time of torrefying dried biomass 22 in the process chamber 11a and the resulting final temperature of the biomass 22. For example, for a process chamber 11a at a temperature of about 500° C., a 15 minutes time provides biocoal with an energy density of about 22 GJ/ton. As indicated by the Time-arrow, an increase in residence time at the same temperature increases the energy density. For a residence time of 30 minutes, the energy density may be about 28 GJ/ton.

This also implies that the amount of tar released from a specific volume of torrefying biomass increases over time. The first and/or second air feeds 15, 16 in some embodiments are controlled to adapt the supply of hot compressed air into the process chamber 11a and/or the conduit 13 to the amount of tar released from the torrefying biomass in order to maintain the temperature of the syngas above a condensation temperature of the tar. In some embodiments the process chamber 11a is arranged to be operated continuously such that different degrees of torrefied biomass is in the process chamber 11a and the amount of released tar remains essentially constant over time.

In the following, the torrefaction process in the torrefaction apparatus according to the invention will be described. While the following description is based on a batch of biomass, it is to be noted that the process is continuous such that produced syngas can be used to heat the process chamber for a following batch.

Biomass 21 is fed into the dryer 17 where it is dried under the support of warm gas 26 from the oxidizer 12. From the biomass 21 the dryer 17 releases water 27 together with the warm gas 26. The dryer 17 supplies dried biomass 22. The dried biomass 22 is fed through the inlet airlock 18 into the process chamber 11a.

In the process chamber 11a the dried biomass 22 is heated to about 280° C. to 400° C. such that it is torrefied and turns over time into biocoal 24 while releasing syngas 23. In various embodiments the residence time of the dried biomass 22 in the process chamber 11a is between 15 and 30 minutes. In various embodiments the temperature at the process chamber 11a is between 400° C. and 550° C., preferably at about 500° C. Once the dried biomass 22 has turned into the predetermined grade of biocoal 24, that is after spending the predetermined residence time inside the process chamber 11a, the biocoal 24 is released through the outlet airlock 19. The biocoal 24 then is transferred to various possible applications such as energy production, as an additive in steel production or as a permanent carbon storage.

During torrefaction the syngas 23 containing tar, $H_2$, $CH_4$ and/or CO is separated from the dried biomass 22 and passes the conduit 13. The syngas 23 in the process chamber 11a and in the conduit 13 is maintained at a temperature above the condensation temperature of tar to prevent condensation of tar. In various embodiments the condensation temperature is about 400° C. In various embodiments the temperature is maintained by preventing temperature exchange with the environment of the process chamber 11a and the conduit 13. In various embodiments the temperature is maintained by combusting a small amount of the tar. In some embodiments air is fed into the process chamber 11a and/or the conduit 13 to combust the tar. In some embodiments the flow of air is controlled to maintain the temperature in the syngas 23 above the condensation temperature of the tar.

The syngas 23 is passed to the oxidizer 12. In various embodiments air is fed into the oxidizer 12. In various embodiments the flow of air fed into the oxidizer 12 is at least sufficient to burn all of the combustible components of the syngas 23. In various embodiments the flow of air fed into the oxidizer 12 is adjusted in order to burn all combustible components of the syngas 23 as well as adjusting the thermal energy 25 provided to the process chamber 11a from the oxidizer 12. In various embodiments the flow of air fed into the oxidizer 12 is adjusted in order to provide warm gas 26 to the dryer 17 in order to dry the biomass 21. In various embodiments the flow of air in the oxidizer 12 is adjusted in order to adjust the temperature of the process chamber 11a at between 400° C. and 550° C., preferably at about 500° C.

In various embodiments the oxidizer air feed 14 adjusts the flow of air. In various embodiments the flow of air is choked in the oxidizer 12 and/or the oxidizer air feed 14 to adjust the flow of air. In various embodiments the flow of air in the oxidizer 12 is adjusted in order to adjust the temperature of the process chamber 11a. In various embodiments the material the process chamber 11a is made of absorbs and dampens temperature fluctuations. This is particularly advantageous for biomass of varying quality that releases syngas of varying component shares during torrefaction.

In the following, several examples of biomass input and biocoal output will be provided. Generally, biomass with a moisture content of roughly 10% has roughly between 16 GJ/ton and 19 GJ/ton. In the following examples, biomass is provided at a flow of 3100 kg/hr. This corresponds to a thermal power capacity of about 14.6 MW.

In a first example, the oxidizer 12 consumes roughly 3 MW in the form of syngas to heat the process chamber 11a and dry the biomass. The process chamber 11a is heated to a temperature of 500° C. A residence time of the biomass inside the process chamber 11a is about 15 minutes. During residence time the biomass heats to about 280° C. The energy yield is about 22 GJ/ton or 11.6 MW corresponding to about 79% of the energy contained in the original biomass.

In a second example the oxidizer 12 consumes roughly 3.4 MW in the form of syngas to heat the process chamber 11a and dry the biomass. The process chamber 11a is heated to a temperature of 500° C. A residence time of the biomass inside the process chamber 11a is about 20 minutes. During residence time the biomass heats to about 300° C. The energy yield is about 24 GJ/ton or 11.2 MW corresponding to about 77% of the energy contained in the original biomass.

In a third example the oxidizer 12 consumes roughly 4 MW in the form of syngas to heat the process chamber 11a and dry the biomass. The process chamber 11a is heated to a temperature of 500° C. A residence time of the biomass inside the process chamber 11a is about 25 minutes. During residence time the biomass heats to about 350° C. The energy yield is about 28 GJ/ton or 10.6 MW corresponding to about 72% of the energy contained in the original biomass.

In a fourth example the oxidizer 12 consumes more than 4 MW in the form of syngas to heat the process chamber 11a and dry the biomass. The process chamber 11a is heated to a temperature of 500° C. A residence time of the biomass inside the process chamber 11a is about 30 minutes. During residence time the biomass heats to more than 400° C. The energy yield is about 30 GJ/ton.

In all examples, the thermal power generated maintains the reaction chamber temperature while at the same time having sufficient excess energy to dry wet biomass having 50% water by weight to approximately 10% water by weight at the inlet of the process chamber.

Please note that for a high energy density above 25 GJ/ton, biocoal can be used in steel production. In these examples up to 100 kW of syngas 23 is burned in the process chamber 11a and/or in the conduit 13 to maintain the temperature of the syngas 23 above a condensation temperature for the tar.

The following table shows several examples of processes according to different embodiments, where "process energy yield" indicates the energy kept in the biocoal after the torrefaction process, "Product energy ratio" indicates a ratio between energy density of the resulting biocoal to the starting biomass, "energy in MJ/kg" indicates the energy density of the starting biomass, "energy out MJ/kg" indicates the energy density of the resulting biocoal and "mass yield" indicates the mass ratio of the resulting biocoal to starting biomass.

| Process energy yield | Product energy ratio | energy in MJ/kg Dry | evergy out MJ/kg Dry | mass yield |
|---|---|---|---|---|
| 79% | 109% | 19.2 | 21 | 71% |
| 78% | 112% | 19.2 | 21.5 | 69% |
| 77% | 115% | 19.2 | 22 | 66% |
| 75% | 120% | 19.2 | 23 | 61% |
| 72% | 125% | 19.2 | 24 | 57% |
| 70% | 130% | 13.2 | 25 | 53% |
| 67% | 135% | 19.2 | 26 | 49% |
| 65% | 141% | 19.2 | 27 | 45% |
| 63% | 146% | 19.2 | 28 | 42% |
| 60% | 151% | 19.2 | 29 | 39% |
| 58% | 156% | 19.2 | 30 | 36% |

The invention claimed is:

1. A torrefaction apparatus comprising:
a process chamber arranged to accommodate a torrefaction process of biomass;
an oxidizer arranged to heat the process chamber; and
a conduit for syngas emitted from the biomass during the torrefaction process;
wherein the conduit is arranged to guide the syngas from the process chamber to the oxidizer;
and wherein the oxidizer is configured to provide an oxidation of the syngas releasing a power of at least 20% of the power contained in a maximum flow of biomass through the process chamber.

2. The torrefaction apparatus of claim 1, wherein the conduit is configured to maintain a syngas temperature during operation above a condensation temperature of the syngas from the process chamber.

3. The torrefaction apparatus of claim 2, wherein the syngas temperature is maintained above 330° C. and/or at a temperature at least 50° C. above a maximum temperature of the biomass in the process chamber.

4. The torrefaction apparatus of claim 1, wherein the conduit is heat insulated.

5. The torrefaction apparatus of claim 1, wherein the conduit and/or the process chamber comprise an air inlet allowing for a controlled combustion of a share of the syngas.

6. The torrefaction apparatus of claim 1, wherein the oxidizer is configured to provide an oxidation releasing a power of at least 23% of the power contained in a maximum flow of biomass through the process chamber.

7. The torrefaction apparatus of claim 1, wherein the oxidizer is configured to maintain the process chamber at a temperature between 400° C. and 550°.

8. The torrefaction apparatus of claim 1, wherein the oxidizer is arranged with an oxidizer air feed, the oxidizer air feed being configured to maintain the temperature of the process chamber below 550° C. by generating a current of ambient dilution air in the direction of the process chamber.

9. The torrefaction apparatus of claim 1, wherein the process chamber has a temperature rating below 600° ° C.

10. The torrefaction apparatus of claim 1, wherein the process chamber comprises a feeding element, a conveying element and/or a dispensing element configured to keep a specific volume of biomass in the process chamber for at least 15 minutes.

11. The torrefaction apparatus of claim 1, wherein the process chamber is configured to minimize spontaneous air exchange between its content and ambient air.

12. The torrefaction apparatus of claim 1, wherein the syngas contains tar, $H_2$, $CH_4$ and/or CO, wherein the oxidizer is configured such as to burn at least part of the tar.

13. The torrefaction apparatus of claim 1, wherein the oxidizer is configured to provide an oxidation releasing a power of at least 27% of the power contained in a maximum flow of biomass through the process chamber.

14. The torrefaction apparatus of claim 13, wherein the oxidizer is configured to provide an oxidation releasing a power of no more than 36% of the power contained in a maximum flow of biomass through the process chamber.

15. The torrefaction apparatus of claim 6, wherein the oxidizer is configured to provide an oxidation releasing a power of no more than 40% of the power contained in a maximum flow of biomass through the process chamber.

16. The torrefaction apparatus of claim 11, wherein the process chamber comprises an inlet having an airlock and an outlet having an airlock to convey biomass through the inlet, the process chamber and the outlet, wherein the process chamber is maintained at a pressure below ambient air pressure.

17. A torrefaction method comprising:
forwarding biomass through a process chamber;
heating the biomass in the process chamber to a temperature and pyrolyzing the biomass to release syngas from the biomass, wherein the syngas contains at least 20% of the power contained in the flow of the biomass; and
oxidizing the syngas to heat the biomass in the process chamber.

18. The torrefaction method of claim 17, wherein a specific volume of biomass is kept in the process chamber for at least 15 minutes.

19. The torrefaction method of claim 17, wherein the syngas temperature is maintained above 330° C. and/or at a temperature at least 50° C. above a maximum temperature of the biomass in the process chamber.

20. The torrefaction method of claim 19, wherein the syngas is mixed with a controlled flow of air.

* * * * *